(12) United States Patent
Chia-Chen

(10) Patent No.: US 7,004,774 B2
(45) Date of Patent: Feb. 28, 2006

(54) MEMORY CARD CONNECTOR

(75) Inventor: Chang Chia-Chen, Hsin Chung (TW)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/764,968

(22) Filed: Jan. 26, 2004

(65) Prior Publication Data

US 2004/0203272 A1  Oct. 14, 2004

(30) Foreign Application Priority Data

Jan. 28, 2003  (TW)  .............................. 92201620 U

(51) Int. Cl.
*H01R 13/703*  (2006.01)

(52) U.S. Cl. ..................................... 439/188
(58) Field of Classification Search ................ 439/159, 439/188, 259, 260, 630, 489, 637; 200/51.1, 200/61.59, 49; 235/441, 482, 483
See application file for complete search history.

(56) References Cited

U.S. PATENT DOCUMENTS 5,334,034 A * 8/1994 Reichardt et al. ........... 439/188
6,394,827 B1 * 5/2002 Nogami ...................... 439/159
6,648,694 B1 * 11/2003 Takamori et al. ........... 439/630

* cited by examiner

*Primary Examiner*—Alexander Gilman
(74) *Attorney, Agent, or Firm*—Charles S. Cohen

(57) ABSTRACT

A memory card connector has an interior cavity for receiving a memory card. The connector includes an insulative housing having a rear terminal-mounting section at the rear of the cavity. A longitudinal side wall section extends forwardly from one end of the rear section at one side of the cavity. The housing has a bottom surface for mounting on a circuit board. A plurality of terminals are mounted on the rear terminal-mounting section of the housing and have contact portions for engaging appropriate contacts on the memory card. A pair of switch terminals are mounted on the side wall section of the housing. One switch terminal has an elastic contact arm which may be engageable by the memory card received in the cavity and movable into engagement with a contact arm of the other switch terminal. A body portion of at least one of the switch terminals is engaged in a retaining slot in the side wall section of the housing. A locking tab projects from the body portion against a locking shoulder on the side wall section in the slot to prevent the body portion from pulling out of the slot. A soldering tab projects from a bottom edge of the body portion for solder connection to the circuit board.

12 Claims, 3 Drawing Sheets

MEMORY CARD CONNECTOR

FIELD OF THE INVENTION

This invention generally relates to the art of electrical connectors and, particularly, to a memory card connector.

BACKGROUND OF THE INVENTION

Memory cards are known in the art and contain intelligence in the form of a memory circuit or other electronic program. Some form of card reader reads the information or memory stored on the card. Such cards are used in many applications in today's electronic society, including video cameras, digital still cameras, smartphones, PDA's, music players, ATMs, cable television decoders, toys, games, PC adapters, multi-media cards and other electronic applications. Typically, a memory card includes a contact or terminal array for connection through a card connector to a card reader system and then to external equipment. The connector readily accommodates insertion and removal of the card to provide quick access to the information and program on the card. The card connector includes terminals for yieldingly engaging the contact array of the memory card.

The memory card connector often is mounted on a printed circuit board. The memory card, itself, writes or reads via the connector and can transmit between electrical appliances, such as a word processor, personal computer, personal data assistant or the like.

Some memory card connectors are provided with a write-protection function by means of a pair of elastic conductive terminals forming a controlling switch. The two elastic terminals are mounted at a side of the connector and have respective elastic arms arranged in close proximity to each other and may or may not be moved into mutual engagement by the memory card to close the controlling switch.

When switching off the write-protection switch, the memory card pushes one of the elastic arms of the switch into engagement with the other elastic arm for electrically connecting the arms. This allows signals to be transmitted between the memory card and the printed circuit board.

When switching on the write-protection switch, the memory card may have a void or recess which will not push the one elastic arm into engagement with the other elastic arm. With the two elastic arms separated, signals cannot be transmitted between the memory card and the printed circuit board.

Unfortunately, problems continue to be encountered with memory card connectors which have such a write-protection function. Specifically, the switch terminals typically are simply mounted in the connector by barbs or an interference force fit, alone. When the memory card is repeatedly inserted into and pulled out of the connector, the elastic terminals become loose and often do not make proper contact. The present invention is directed to solving these problems.

SUMMARY OF THE INVENTION

An object, therefore, of the invention is to provide a new and improved memory card connector of the character described and having at least a pair of switch terminals mounted on the connector housing.

In the exemplary embodiment of the invention, the connector has an interior cavity for receiving a memory card. An insulative housing has a rear terminal-mounting section at the rear of the cavity. A longitudinal side wall section extends forwardly from one end of the rear section at one side of the cavity. The housing has a bottom surface for mounting on a circuit board. A plurality of terminals are mounted on the rear terminal-mounting section of the housing and have contact portions for engaging appropriate contacts on the memory card. A pair of switch terminals are mounted on the side wall section of the housing. One switch terminal has an elastic contact arm which may be engageable by the memory card received in the cavity and movable into engagement with a contact arm of the other switch terminal. Complementary interengaging mounting means are provided between at least one of the switch terminals and the longitudinal side wall section of the housing and includes a body portion of the one switch terminal engaged in a retaining slot in the side wall section. A locking tab projects from the body portion against a locking shoulder in the slot in the side wall section to prevent the body portion from pulling out of the slot. The one switch terminal has a soldering tab projecting from a bottom edge of the body portion for solder connection to the circuit board.

As disclosed herein, both switch terminals have body portions engaged in retaining slots in the side wall section of the housing. Both switch terminals have soldering tabs projecting from bottom edges of the body portions of the terminals. Both switch terminals have elastic contact arms.

According to one aspect of the invention, the switch terminals are stamped and formed of sheet metal material. The locking tab of the one switch terminal is stamped and bent out of an opening in the body portion to define a locking edge engageable with the locking shoulder on the side wall section. The body portion is generally planar, and the locking tab is bent outwardly of the plane of the body portion for snapping into engagement with the locking shoulder on the side wall section automatically in response to inserting the body portion into the retaining slot. The body portion of one or both of the switch terminals may be stamped with barbs engageable with the side wall section in the retaining slot.

According to another aspect of the invention, the elastic contact arm of the one switch terminal is at one end thereof adjacent the longitudinal side wall section of the housing. A second elastic contact arm is at an opposite end of the terminal adjacent the rear terminal-mounting section of the housing for engaging a third switch contact in response to insertion of the memory card into the cavity. The terminal is generally L-shaped to define the two elastic contact arms.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
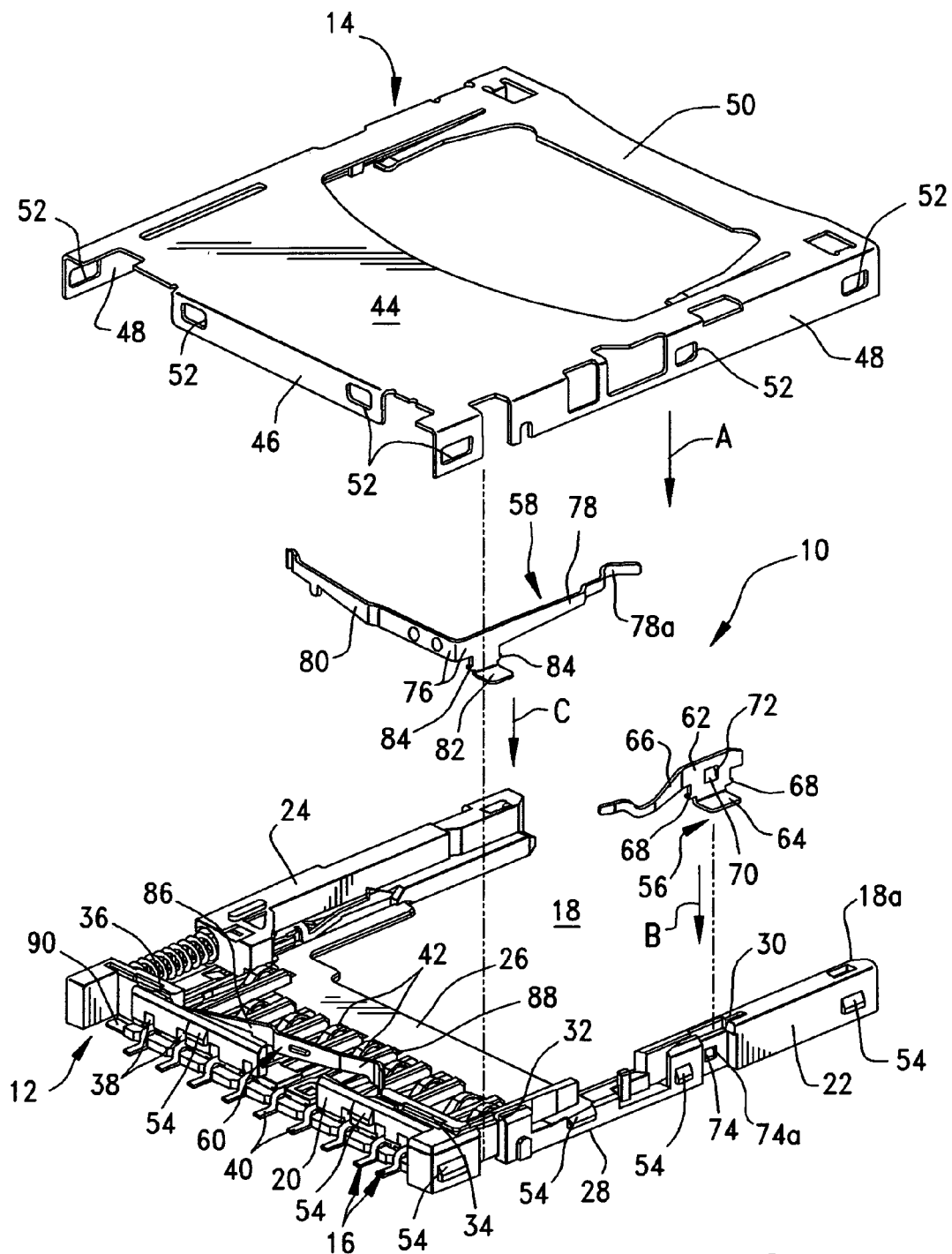
FIG. 1 is an exploded perspective view of a memory card connector embodying the concepts of the invention.

Referring to the drawings in greater detail, the invention is embodied in a memory card connector, generally designated 10 (FIGS. 1 and 2), which includes a housing, generally designated 12, and a cover, generally designated 14, along with a plurality of terminals, generally designated 16, mounted on the housing. The housing is fabricated of insulating material such as molded plastic, and the cover is fabricated of metal such as stamped and formed sheet metal material.

The cover and the housing combine to form an interior card-receiving cavity 18 having an open mouth 18a at a front receptacle area of the connector. The mouth permits insertion and removal of a memory card into and out of cavity 18.

The molded plastic insulating housing 12 of connector 10 may be generally U-shaped (as shown) or L-shaped (not shown). In either event, the housing has a rear terminal-mounting section 20 which traverses the rear of cavity 18, along with a longitudinal side wall section 22 (and 24) which extends forwardly from one or both ends of the rear section to define one or both sides of cavity 18. The housing includes a bottom plate 26, and the overall housing has a bottom surface 28 for mounting on top of a printed circuit board (not shown). Side wall section 22 has first and second narrow slots 30 and 32, respectively, which open at the top of the side wall section. The rear terminal-mounting section 20 has first and second narrow slots 34 and 36 which open at the top thereof.

Terminals 16 are mounted within a plurality of through passages 38 (FIG. 1) in rear terminal-mounting section 20 of the housing. Each terminal includes a tail portion 40 generally flush with bottom surface 28 of the housing for connection, as by soldering, to appropriate circuit traces on the printed circuit board. Terminals 16 also have contact portions 42 for engaging appropriate contacts on the memory card, such as at the bottom of the card.

Figure 2:
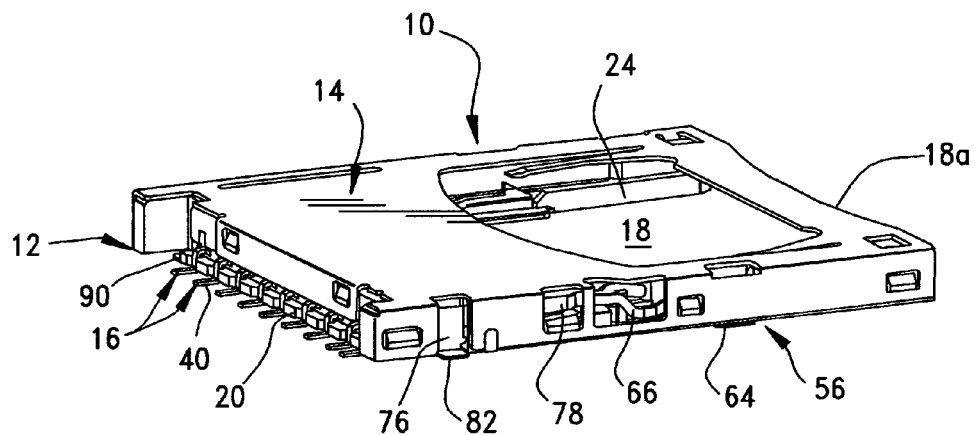
FIG. 2 is a perspective view of the connector in assembled condition.

Cover 14 of connector 10 includes a top wall 44, a depending rear wall 46 and depending side walls 48. Top wall 44 substantially covers the entire terminal contact array of the connector. Rear wall 46 depends downwardly over the back side of rear section 20 of the housing. Side walls 48 depend downwardly over the outsides of side wall sections 22 and 24 of the housing. A brace portion 50 of the cover spans cavity 18 across open mouth 18a thereof. Cover 14 is mounted to housing 12 simply by pushing the cover downwardly in the direction of arrow "A" (FIG. 1). Rear wall 46 and side walls 48 of the cover have mounting apertures 52 which "snap" into latching engagement with a plurality of chamfered latch bosses 54 on the outsides of rear section 20 and side wall sections 22 and 24 of the housing.

The switching system of connector 10 is embodied in a first switch terminal, generally designated 56; a second switch terminal, generally designated 58; and a third switch terminal, generally designated 60. All of the switch terminals are stamped and formed from conductive sheet metal material. First switch terminal 56 includes a generally planar body portion 62 having a soldering tab 64 bent outwardly from the bottom edge thereof. An elastic contact arm 66 projects generally horizontally from one side of the body portion. A pair of barbs 68 project outwardly from opposite side edges of the body portion. Finally, a locking tab 70 is stamped and formed out of an opening 72 in the body portion. As best seen in FIG. 1, the locking tab is bent along its bottom edge and, thereby, will project inwardly out of the plane of the body portion.

First switch terminal 56 is mounted into side wall section 22 of housing 12 by pushing the switch terminal downwardly in the direction of arrow "B" (FIG. 1) to force planar body portion 62 into narrow retaining slot 30. The terminal is pushed downwardly until locking tab 70 snaps into a locking recess 74 at the outside of side wall section 22, within retaining slot 30, as best seen in FIG. 1. When so locked, soldering tab 64 will be flush with bottom surface 28 of the housing. Barbs 68 at the side edges of body portion 62 bite into the plastic material of the housing within retaining slot 30. The terminal cannot be pulled out of the slot because the upper edge of locking tab 70 will abut against a locking shoulder 74a defined by the top of locking recess 74.

Second switch terminal 58 is generally L-shaped and includes an L-shaped body portion 76 and first and second elastic contact arms 78 and 80 which extend at a right angle to each other. A soldering tab 82 projects outwardly from a bottom edge of the body portion. Barbs 84 project outwardly from opposite edges of the body portion. Second switch terminal 58 is mounted onto housing 12 in the direction of arrow "C" (FIG. 1) so that the L-shaped body portion 76 is pushed into narrow slots 32 and 34 of the housing, until soldering tab 82 is flush with bottom surface 28 of the housing. Barbs 84 bite into the plastic material of the housing within slot 32.

Third switch terminal 60 includes a body portion 86 mounted into narrow slot 36 in rear section 20 of the housing. An elastic contact arm 88 projects from the body portion and is cantilevered into cavity 18 at the rear thereof. A soldering tab 90 projects outwardly from the bottom of body portion 86 generally flush with bottom surface 28 of the housing.

Soldering tabs 64 and 90 of switch terminals 56 and 60 may be connected, as by soldering, to appropriate signal circuit traces on the printed circuit board. Soldering tab 82 of switch terminal 58 may be connected, as by soldering, to a ground circuit trace, for instance, on the printed circuit board.

Figure 4:
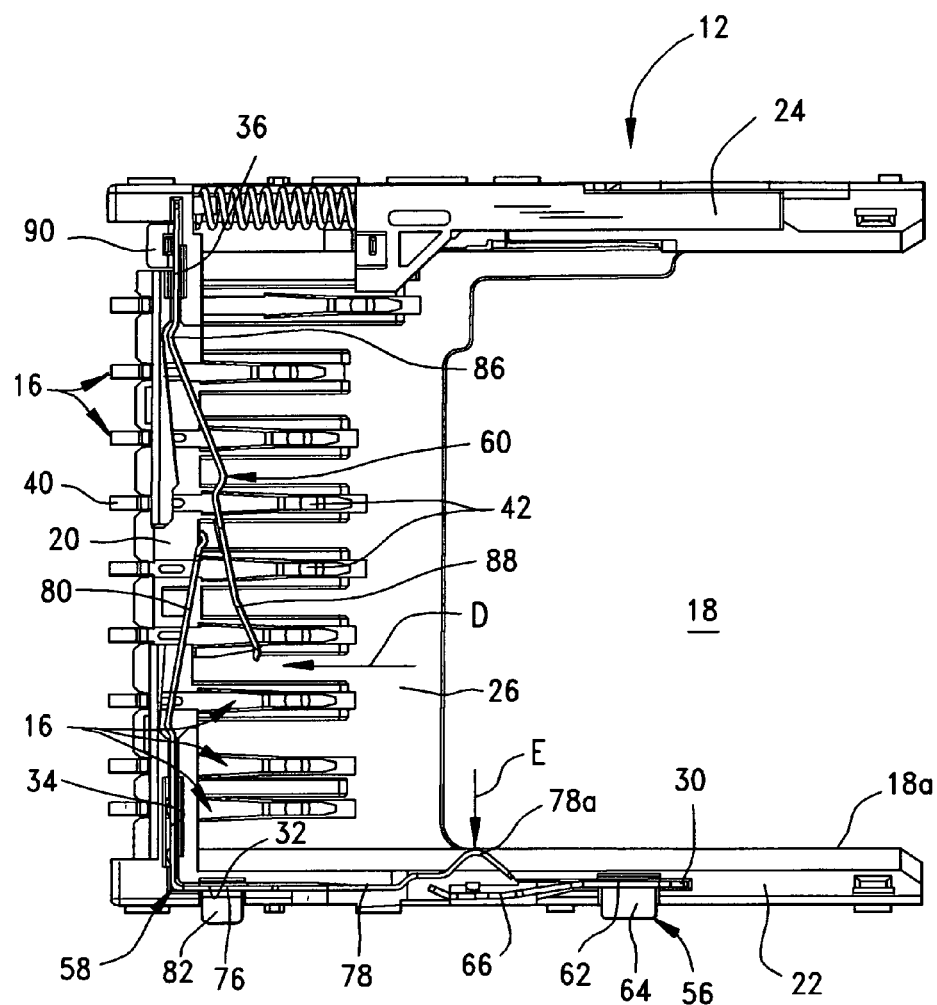
FIG. 4 is an enlarged top plan view of the connector, with the cover removed.

FIG. 4 shows the relative proximity of elastic contact arm 80 of switch terminal 58 and elastic contact arm 88 of switch terminal 60. It can be seen that these two elastic contact arms are cantilevered into cavity 18 at the rear thereof and are normally maintained in a spaced condition until a memory card is inserted completely into the cavity. When fully inserted, a front edge of the memory card will engage elastic contact arm 88 and push the contact arm rearwardly in the direction of arrow "D" until the contact arm engages elastic contact arm 80 of switch terminal 58. This will close a circuit and allow the memory card to function in its writing or reading capacity via connector 10. Such a switch as afforded by contact arms 80 and 88 of terminals 58 and 60, respectively, often are called end-of-position switches or card detection switches.

FIG. 4 also shows the relative proximity of elastic contact arm 78 of switch terminal 58 and elastic contact arm 66 of switch terminal 56. It can be seen that the elastic contact arms are out of engagement in a normally open condition in the absence of a memory card in cavity 18. These elastic contact arms of switch terminals 56 and 58 form a write-protection switch for connector 10.

Specifically, in a write-enable condition the memory card will push elastic contact arm 78 in the direction of arrow "E" and into engagement with elastic contact arm 66 for electrically connecting the two elastic contact arms.

Therefore, signals are enabled to be transmitted between the memory card and the printed circuit board.

In a write-inhibit condition, the memory card will have a void or recess aligned with a contact portion 78a of elastic contact arm 78 so that the elastic contact arm 78 will not engage elastic contact arm 66. With the two elastic contact arms separated, signals are inhibited from being transmitted between the memory card and the printed circuit board.

Figure 3:
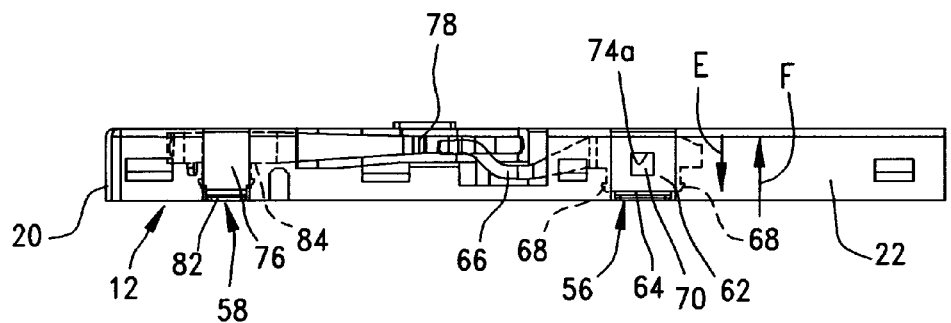
FIG. 3 is an enlarged side elevational view of the connector, with the cover removed.

FIG. 3 shows how first switch terminal 56 is positively locked to side wall section 22 of housing 12. Specifically, the switch terminal cannot move downwardly in the direction of arrow "E" because of the rigid solder engagement of soldering tab 64 with the printed circuit board. The terminal cannot move upwardly in the direction of arrow "F" because of the rigid engagement of the upper edge of locking tab 70 with locking shoulder 74a at the top of locking recess 74 (FIG. 1). The terminal cannot move inwardly or outwardly generally parallel to the plane of the printed circuit board because of a snug fit of the generally planar body 62 within narrow retaining slot 30. Finally, the switch terminal cannot move in a forward or backward direction generally parallel to the printed circuit board because barbs 68 bite into the plastic material of the housing within retaining slot 70. Therefore, it can be seen that switch terminal 56 is positively locked in all directions, in a rigid, fixed position to prevent any loosening when the memory card is repeatedly inserted into and pulled out of cavity 18 of the connector.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A memory card connector having an interior cavity for receiving a memory card, comprising:
    an insulative housing having a rear terminal-mounting section at the rear of the cavity, and at least one longitudinal side wall section extending forwardly from one end of the rear section at one side of the cavity, the housing having a bottom surface for mounting on a circuit board;
    a plurality of terminals mounted on the rear terminal-mounting section of the housing and having contact portions for engaging appropriate contacts on the memory card;
    a pair of switch terminals mounted on the side wail section of the housing, one switch terminal having an elastic contact arm which may be engageable by the memory card received in the cavity and movable into engagement with a contact arm of the other switch terminal;
    complementary interengaging mounting means between at least one of the switch terminals and said longitudinal side wall section of the housing and including a body portion of the at least one switch terminal engaged in a retaining slot in the side wall section, and a locking tab projecting from the body portion against a locking shoulder on the side wall section in the slot to prevent the body portion from pulling out of the slot; and
    said at least one switch terminal having a soldering tab projecting from a bottom edge of the body portion for solder connection to the circuit board,
    wherein said elastic contact arm of said one switch terminal is at one end thereof adjacent said longitudinal side wall section of the housing, and including a second elastic contact arm at an opposite end of the one switch terminal adjacent the rear terminal-mounting section of the housing for engaging a third switch terminal in response to insertion of the memory card into the cavity.

2. The memory card connector of claim 1 wherein the contact arms of both switch terminals are elastic.

3. The memory card connector of claim 1 wherein the body portion of said at least one switch terminal includes barbs engageable with the side wall section in said retaining slot.

4. The memory card connector of claim 1 wherein said one switch terminal is generally L-shaped.

5. The memory card connector of claim 1 wherein both of said switch terminals have body portions engaged in retaining slots in the at least one side wall section of the housing.

6. The memory card connector of claim 5 wherein both of said switch terminals have soldering tabs projecting from bottom edges of the body portions.

7. The memory card connector of claim 1 wherein said switch terminals are stamped and formed of sheet metal material, and said locking tab is stamped and bent out of an opening in the body portion to define a locking edge engageable with the locking shoulder on the at least one side wall section.

8. The memory card connector of claim 7 wherein said body portion is generally planar and said locking tab is bent out of the plane of the body portion to define said locking edge engageable with the locking shoulder.

9. A memory card connector having an interior cavity for receiving a memory card, comprising:
    an insulative housing having a rear terminal-mounting section at the rear of the cavity, and at least one longitudinal side wall section extending forwardly from one end of the rear section at one side of the cavity, the housing having a bottom surface for mounting on a circuit board;
    a plurality of terminals mounted on the rear terminal-mounting section of the housing and having contact portions for engaging appropriate contacts on the memory card;
    a first switch terminal stamped and formed of conductive sheet metal material and including a generally planar body portion engaged in a narrow retaining slot in the side wall section of the housing, a soldering tab projecting from a bottom edge of the body portion for solder connection to the circuit board, and an elastic contact arm projecting from the body portion and engageable by the memory card received in the cavity; and
    a second switch terminal stamped and formed of conductive sheet metal material and including a generally planar body portion inserted into a narrow retaining slot in the side wall section of the housing, a contact arm projecting from the body portion and engageable by the elastic contact arm of the first switch terminal, a soldering tab projecting from a bottom edge of the body portion for solder connection to the circuit board, and a locking tab stamped and bent out of an opening in the body portion to define a locking edge engageable with a locking shoulder on the side wall section in the slot to prevent the body portion from pulling out of the slot,
    wherein said elastic contact arm of said first switch terminal is at one end thereof adjacent said longitudinal side wall section of the housing, and including a second contact arm at an opposite end of the first switch terminal adjacent the rear terminal-mounting section of the housing for engaging a third switch terminal in response to insertion of the memory card into the cavity.

10. The memory card connector of claim 9 wherein the body portion of at least said second switch terminal includes barbs engageable with the side wall section in said retaining slot.

11. The memory card connector of claim 9 wherein the elastic contact arm of said first switch terminal has a distal end engageable by the memory card and movable into engagement with the contact arm of said second switch terminal.

12. The memory card connector of claim 9 wherein said first switch terminal is generally L-shaped.

* * * * *